(12) United States Patent
Popescu

(10) Patent No.: US 8,787,504 B2
(45) Date of Patent: Jul. 22, 2014

(54) ENHANCING CHANNEL ESTIMATES MADE IN DIGITAL COMMUNICATIONS RECEIVERS

(71) Applicant: Cambridge Silicon Radio Limited, Cambridge (GB)

(72) Inventor: Andrei Barbu Popescu, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 0 days.

(21) Appl. No.: 13/679,942

(22) Filed: Nov. 16, 2012

(65) Prior Publication Data

US 2013/0177056 A1    Jul. 11, 2013

(30) Foreign Application Priority Data

Nov. 18, 2011   (EP) .................................... 11189856

(51) Int. Cl.
 *H04L 27/06* (2006.01)
(52) U.S. Cl.
 USPC ......................................... 375/340

(58) Field of Classification Search
 USPC ......... 375/224, 227, 260, 285, 316, 340, 342, 375/346, 348
 See application file for complete search history.

(56) References Cited

U.S. PATENT DOCUMENTS

| 8,428,001 B2* | 4/2013 | Vrcelj et al. ................... 370/324 |
| 8,582,634 B2* | 11/2013 | Li et al. ......................... 375/229 |
| 2001/0038617 A1* | 11/2001 | Schmidl et al. ............... 370/335 |
| 2005/0163257 A1* | 7/2005 | Keerthi ......................... 375/340 |
| 2006/0215539 A1 | 9/2006 | Vrcelj |
| 2010/0098146 A1* | 4/2010 | Kim et al. ..................... 375/232 |

FOREIGN PATENT DOCUMENTS

WO   WO 2011/106626   9/2011

OTHER PUBLICATIONS

Search Report dated Apr. 20, 2012 in corresponding EP11 18 9856.

* cited by examiner

*Primary Examiner* — Khanh C Tran
(74) *Attorney, Agent, or Firm* — Pillsbury Winthrop Shaw Pittman LLP

(57) ABSTRACT

Schemes for combining channel-estimates from different OFDM frames after compensating for changes in receiver-transmitter characteristics.

7 Claims, 4 Drawing Sheets

ENHANCING CHANNEL ESTIMATES MADE IN DIGITAL COMMUNICATIONS RECEIVERS

CROSS-REFERENCE TO RELATED APPLICATIONS

This application claims priority to EP 11189856.5 filed Nov. 18, 2011, which is incorporated herein by reference in its entirety.

FIELD

The invention relates to the field of digital data communications.

BACKGROUND

Receivers in packetized radio communication systems using OFDM modulation (such as those conforming to the IEEE 802.11n-2009 standard) require a channel estimate in order to perform reception. The standard way to compute the channel estimate used for reception of an 802.11n OFDM frame is by using information contained solely within that frame, primarily training fields ('long training fields' or 'LTFs' in 802.11n terminology) that are part of the frame preamble.

However, receiver sensitivity will be limited by the inaccuracy of a channel estimate computed solely based on the LTFs and data symbols of a noisy frame. Known techniques that improve the channel estimate include channel tracking and channel estimate smoothing. However, use of these techniques is not sufficient to render negligible the loss in receiver sensitivity due to channel estimate inaccuracy.

In an 802.11n OFDM receiver, a typical calculation of the frequency-domain channel estimate includes computing an FFT of the received LTF (or possibly of multiple LTFs for MIMO transmissions):

$$L_m(k) = FFT_k(l_m(n))$$

where $n=0 \ldots N_{sym}-1$ is the LTF sample index, k is the sub-carrier index, m is the index of the LTF, l.

Then, the channel estimate is generally computed as a linear combination of the values $L_m(k)$ for different m. A simple case is that of a single-antenna receiver receiving frames with single space-time-stream modulation, where only one LTF is used to compute the channel estimate.

The LTF signals observed by a receiver in consecutive frames are different even if the channel is the same. A number of factors characteristic of typical receiver and transmitter circuits may contribute to this. First, the difference between the RF carrier angle of the receiver and transmitter changes over time. Second, the LTF is sampled at a different time in different frames, because there is a difference between the baseband sampling clocks at the transmitter and receiver, and/or the frame (boundary) timing estimation is different in different frames. Third, the receiver performs automatic gain control and selects different gains for receiving different frames (and also the gain applied by the transmitter may vary).

Typically, 802.11n OFDM receivers use the LTFs of a frame to form a channel estimate for processing that same frame. Information from data symbols throughout the frame may however be used to improve the channel estimate. For instance, channel tracking can gradually improve the channel estimate as the receiver progresses through processing the frame. However, the quality of the channel estimate during the first data symbols of a frame is predominantly determined by the quality ('noisiness') of the LTFs of that frame.

Channel smoothing is another well-known technique that improves the quality of the channel estimate when the received signal is noisy. However, channel smoothing may not be possible in combination with transmit beamforming. Accordingly, the 802.11n standard has provisions to prevent a receiver from performing channel smoothing.

SUMMARY

The invention is defined by the appended claims, to which reference should now be made.

The invention may thus provide means to improve the accuracy of the channel estimate used to receive an OFDM frame (such as a WLAN frame conforming to the IEEE 802.11n-2009 standard), thereby improving the receiver sensitivity.

The invention may thus improve the channel estimate used by a packetized system receiver to receive a frame, by using the channel estimate(s) computed from one (or more) previous frame(s).

The invention makes use of the fact that consecutive packets transmitted between a transmitter and a receiver in a packetized system may pass through similar instances of the radio channel. This is the case for consecutive packets received from the same transmitter, within a time that is a small fraction of the channel coherence time. (The channel coherence time for an 802.11 wireless LAN link is of several hundreds of milliseconds in typical operating environments, whereas the typical duration of data frames is of the order of hundreds of microseconds, up to a few milliseconds.)

BRIEF DESCRIPTION OF THE DRAWINGS

By way of example only, certain embodiments of the invention will now be described by reference to the accompanying drawings, in which.

DETAILED DESCRIPTION

Figure 1:
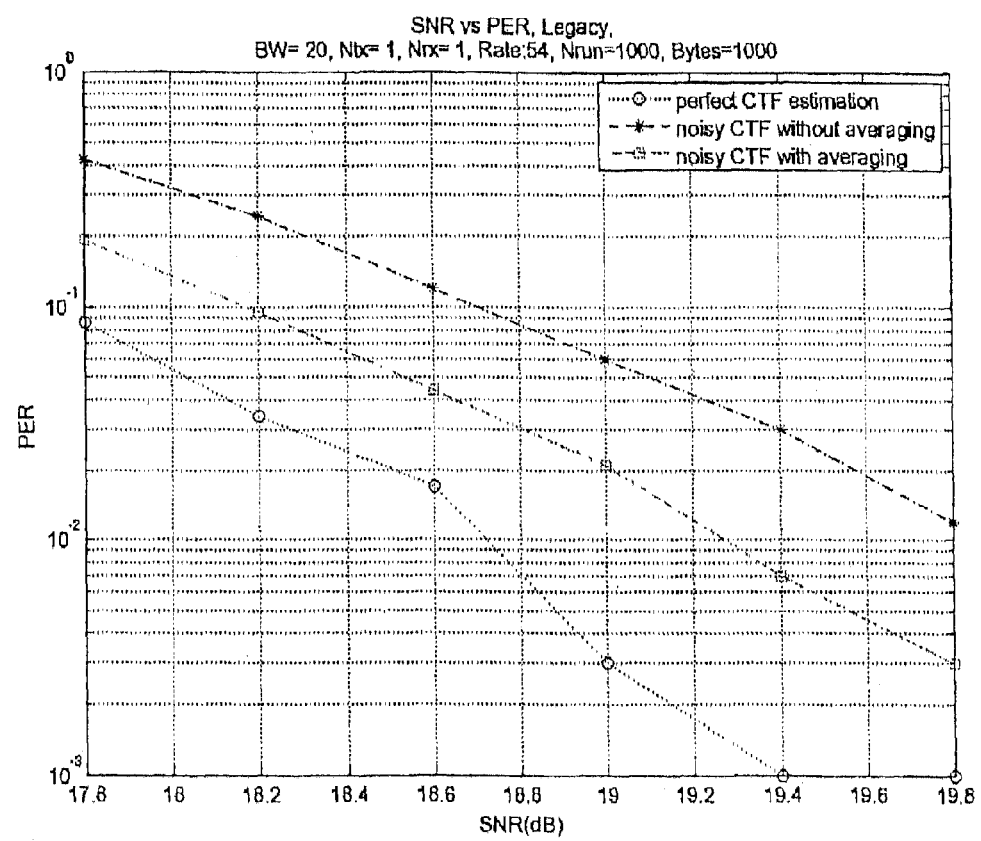
FIG. 1 is a plot illustrating an improvement in receiver sensitivity attributable to channel estimate averaging when receiving 'Legacy' (IEEE 802.11a) OFDM frames.

To repeat what was said earlier, in an 802.11n OFDM receiver, a typical calculation of the frequency-domain channel estimate includes computing an FFT of the received LTF (or possibly of multiple LTFs for MIMO transmissions):

$$L_m(k) = FFT_k(l_m(n))$$

where $n=0 \ldots N_{sym}-1$ is the LTF sample index, k is the sub-carrier index, m is the index of the LTF, l.

Then, the channel estimate is generally computed as a linear combination of the values $L_m(k)$ for different m. A simple case is that of a single-antenna receiver receiving frames with single space-time-stream modulation, where only one LTF is used to compute the channel estimate.

The LTF signals observed by a receiver in consecutive frames are different even if the channel is the same. A number of factors characteristic of typical receiver and transmitter circuits may contribute to this. First, the difference between the RF carrier angle of the receiver and transmitter changes over time. Second, the LTF is sampled at a different time in different frames, because there is a difference between the baseband sampling clocks at the transmitter and receiver, and/or the frame (boundary) timing estimation is different in different frames. Third, the receiver performs automatic gain control and selects different gains for receiving different frames (and also the gain applied by the transmitter may vary).

In general, assuming that the channel does not change, the LTF $l_m(t)$ observed by a receiver during reception of a frame is related to the same LTF observed during a previous frame $l'_m(t)$:

$$l_m(t) = l'_m(t - T_0) e^{j\Phi_0} G_0 \quad (1)$$

where $T_0$ is the difference between the sampling times of the LTF in the two frames, $\Phi_0$ is the difference between the carrier angles seen by the receiver in the two frames, $G_0$ is the ratio of the receiver gains used during reception of the two frames.

In the frequency domain, equation (1) translates to:

$$L_m(k) = L'_m(k) e^{j\Phi_0} e^{j2\pi k T_0} G_0 \quad (2)$$

Assuming that the channel estimate $C(k)$, which may be a matrix in a MIMO system, is computed as a linear combination of the values $L_m(k)$, it is also related to the previous channel estimate $C'(k)$:

$$C(k) = C'(k) e^{j\Phi_0} e^{j2\pi k T_0} G_0 \quad (3)$$

If compensation can be made for these factors (to 'align' the channel estimates), then channel estimates from different frames can be compared and used in combination.

To perform this alignment, the following scheme, based on a parametric model of the ratio between the channel estimates observed by the receiver in different frames, as expected from equation (3), can be used. For simplicity, it is assumed in the following exemplary scheme that the channel estimate $C(k)$ is a scalar:

1. Compute the ratio $R(k) = C(k)/C'(k)$.
2. 'Fit' to $R(k) = C(k)/C'(k)$ a function $R_i(k) = e^{j\Phi} e^{j2\pi k T} G$, i.e. compute parameters $\Phi$, $T$, $G$ that minimise the difference between $R_i(k)$ and $R(k)$.
3. The 'aligned' version of $C'(k)$ is $C'_{align}(k) = C'(k) R_i(k)$ The parameter G may be estimated as follows:
Take the average of the amplitudes of $R(k)$ for a suitable set of sub-carriers $S_1$, $$M = \frac{1}{|S_1|} \sum_{k \in S_1} |R(k)|,$$

where $|S_1|$ denotes the number of sub-carriers in set $S_1$ and $|R(k)|$ is the amplitude of $R(k)$. For example, $S_1$ may include all the data and pilot sub-carriers.

If the average M is 'close' to 1, then take G=1 (i.e. assume that the receiver gains used in receiving the current frame and the previous frame are the same). Receiver gain steps are generally discrete and M can be deemed to be 'close' to 1 if it is less than one half of a gain step away from 1.

Otherwise, take G=M.

Thus, an averaging-based calculation is used to yield a value for G.

The parameter T may be estimated as follows:
First compute the 'unwrapped' angles of $R(k)$ for all sub-carriers, $\alpha(k) = \text{unwrap}(\angle(R(k)))$, where $\angle(\bullet)$ signifies the angle of the argument (of the complex number in brackets). 'Unwrapping' the angles of $R(k)$ means that they are processed by adding multiples of $\pm 2\pi$ to them so that phase jumps between the angles of consecutive sub-carriers are between $-\pi$ and $\pi$. See also the Matlab® 'unwrap' function.

Then compute the average of $\alpha(k)/k$ for a suitable subset of carriers $S_2$:

$$T = \frac{1}{2\pi} \sum_{k \in S_2} \alpha(k)/k.$$

For example, $S_2$ may include sub-carriers $-26 \ldots -16$ and $16 \ldots 26$ for 20 MHz channel transmissions.

Thus, an averaging-based calculation is used to yield a value for T.

The parameter $\Phi$ may be estimated as follows:

$$\Phi = \frac{1}{|S_3|} \sum_{k \in S_3} \angle(R(k) e^{-j2\pi k T}),$$

where $S_3$ is a suitable set of sub-carriers. For example, $S_3$ may include all the data and pilot sub-carriers. $|S_3|$ is the number of sub-carriers in the set $S_3$. The value used for T is an estimate obtained using the method outlined above (or T is given the value zero if it is not being estimated because it is deemed an insignificant contributor).

Thus, an averaging-based calculation is used to yield a value for $\Phi$.

The values G, T and $\Phi$ can be thought of as representing a shift in the operating state of the system represented by the receiver and the transmitter jointly, occurring over the interval between the frames to which $C(k)$ and $C'(k)$ relate. Of course, it may be the case that only one or two of $\Phi_0$, $T_0$ and $G_0$ are significant in a given scenario, in which case only the significant ones of $\Phi$, T and G need to be estimated. As a more concrete example, if there is no significant gain change $G_0$ between the $C(k)$ and $C'(k)$ frames, then only $\Phi$ and T need to be estimated.

Having thus estimated values for G, T and $\Phi$, the similarity of $C'_{align}(k)$ and $C(k)$ may be estimated as a suitable measure of the distance D between them, for example:

$$D(C'_{align}(k), C(k)) = \sum_k \text{abs}(C'_{align}(k) - C(k)) \Big/ \sum_k \text{abs}(C(k)))$$

If the distance between the aligned previous channel estimate and the current channel estimate is less than a threshold, then the receiver adopts an average of the current and previous channel estimates, in replacement of the current channel estimate:

$$C_{avg}(k) = \sigma C'_{align}(k) + (1 - \sigma) C(k)$$

The weighting $\sigma$ may depend on the distance between the current and previous channel estimates, and on estimated SNR (signal to noise ratio). For example: if $D(C'_{align}(k), C(k)) < 0.15$, then $\sigma = 0.7$, else $\sigma = 0$.

Figure 2:
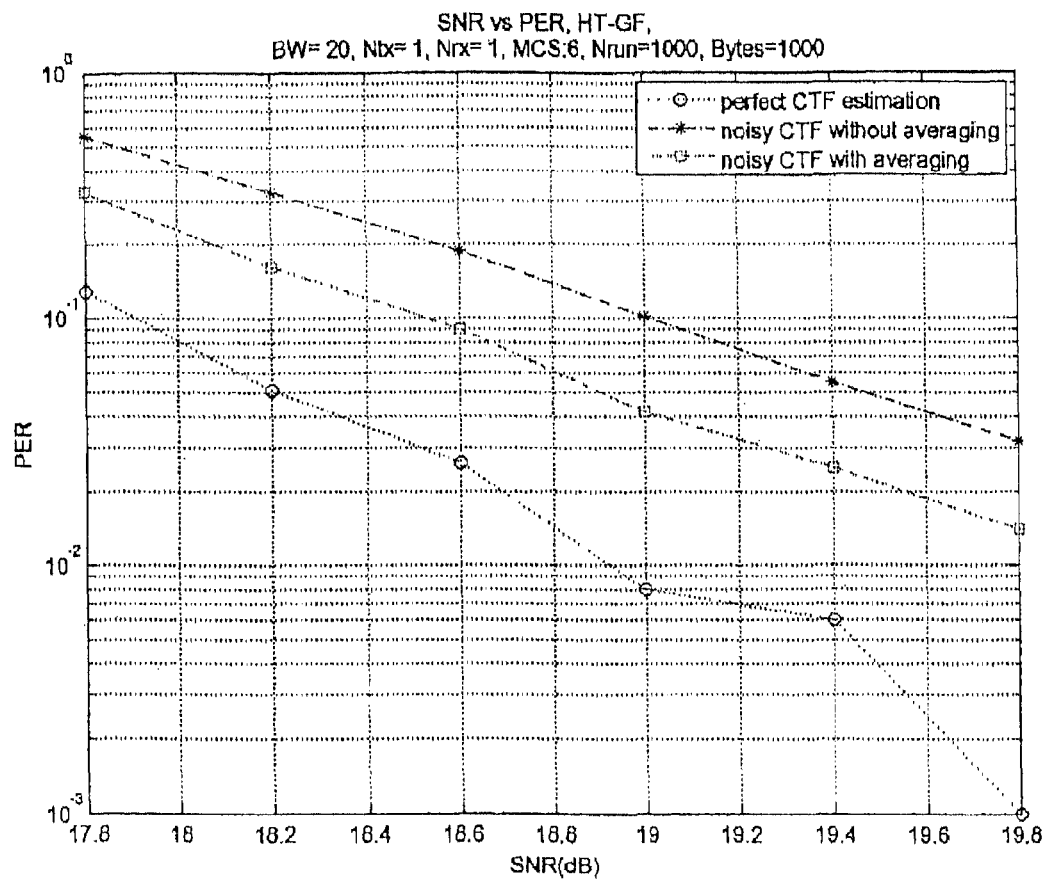
FIG. 2 is a plot illustrating improvement in receiver sensitivity attributable to channel estimate averaging when receiving High Throughput frames with Greenfield preamble (IEEE 802.11n) OFDM frames.
Figure 3:
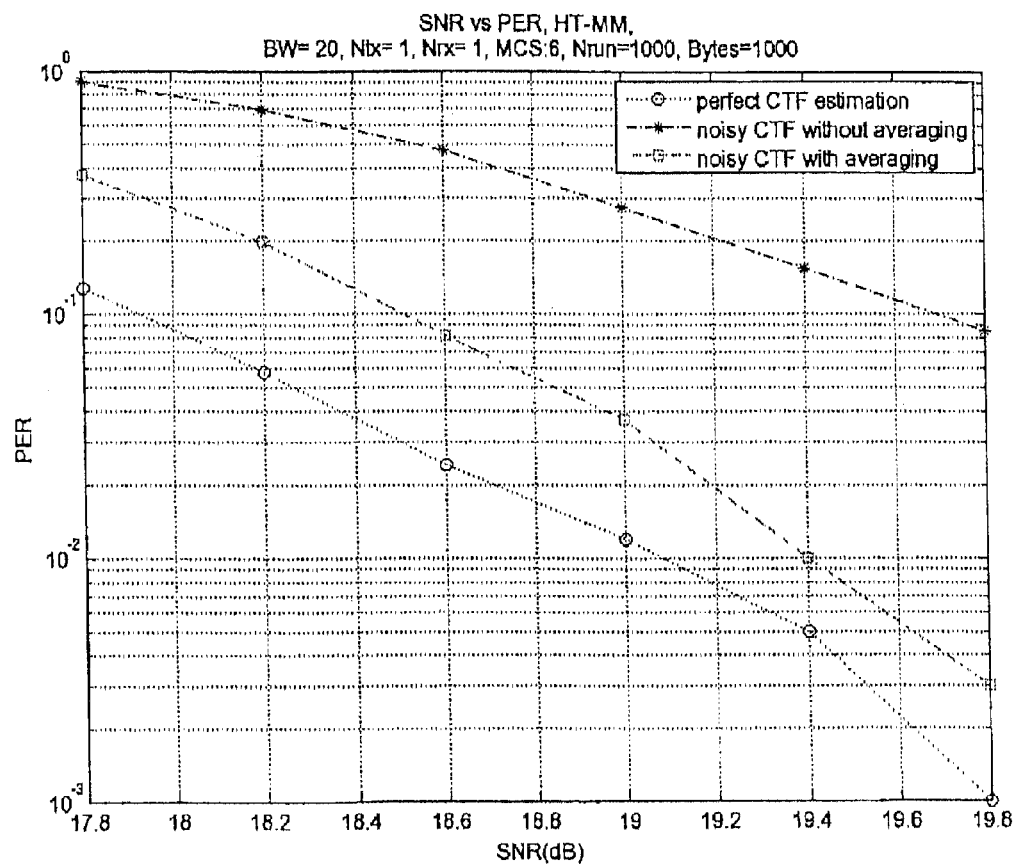
FIG. 3 is a plot illustrating improvement in receiver sensitivity attributable to channel estimate averaging when receiving High Throughput frames with Mixed Format preamble (IEEE 802.11n) OFDM frames.

FIGS. 1 to 3 illustrate the simulated improvement in receiver sensitivity obtained in a static channel without fading, i.e. when the receive signal is only corrupted by additive white Gaussian noise. In these figures 'CTF' stands for 'Channel Transfer Function'; 'CTF estimation' is what is called 'channel estimation' elsewhere in this document. Note that the improvement in receiver sensitivity attributable to channel estimate averaging is greater for reception of High Throughput Mixed Format frames. This is because the LTF is shorter in these frames (4 μs) compared with Greenfield and 802.11a 'Legacy' frames where the longer (8 μs) LTF yields a more accurate channel estimate prior to averaging. The LTFs used in transmissions according to the IEEE 802.11ac draft standard (the VHT-LTFs) are also 4 us long, hence the improvement in receiver sensitivity attributable to channel estimate averaging when receiving 802.11ac frames is expected to be similar to that obtained when receiving 802.11n High Throughput Mixed Format frames.

Figure 4:
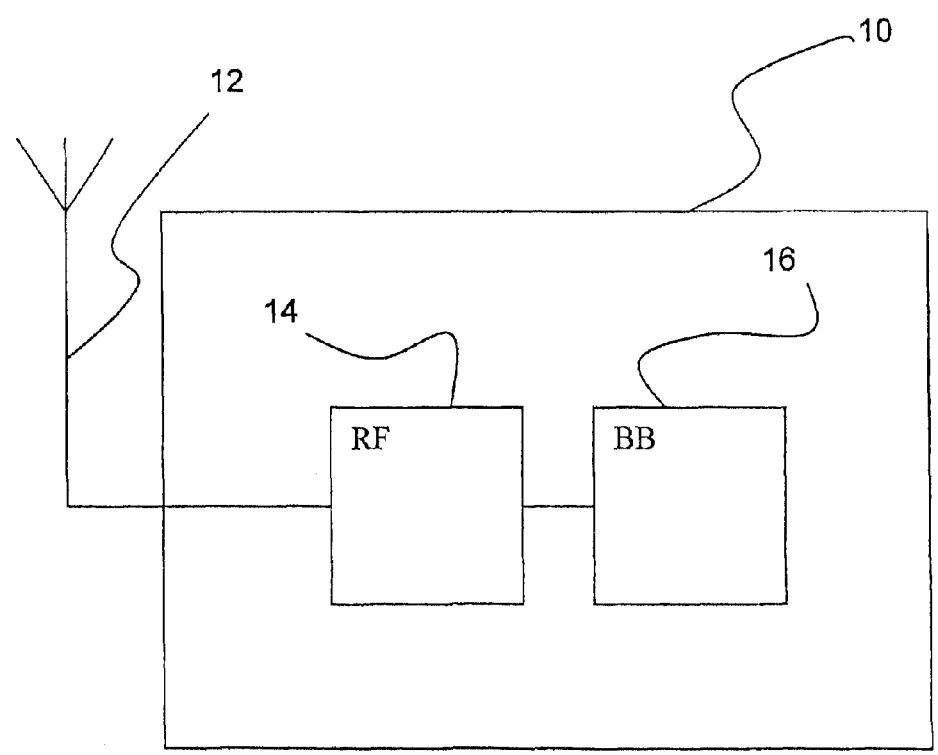
FIG. 4 is a block diagram illustrating an OFDM receiver.

FIG. 4 shows a basic outline of exemplary apparatus for implementing the channel estimation refinement techniques described above. FIG. 4 shows an OFDM receiver 10. As shown, the receiver 10 comprises an antenna 12, an RF front end 14 and a baseband processor 16. In practice, the OFDM receiver 10 will comprise many other features, although they are not shown here since they are peripheral to the theme of the present invention.

The OFDM receiver 10 receives radio signals via the antenna 12. These radio signals are demodulated to baseband by the RF front end 14. The baseband signals thus produced are processed by the baseband processor 16. The baseband processor 16 will attempt to demodulate OFDM data from the baseband signals and in doing so the baseband processor 16 employs the channel estimation refinement techniques discussed at length above.

What is claimed is:

1. A method of refining a channel estimate for an OFDM sub-carrier, the method comprising:
    calculating a first channel estimate for an OFDM sub-carrier for a first OFDM frame received at a receiver from a transmitter;
    calculating a second channel estimate for the OFDM sub-carrier for a second OFDM frame received at the receiver from the transmitter at a time later than the first OFDM frame is received;
    adjusting the first channel estimate to ameliorate a difference between the first and second channel estimates that arises from a shift in an operating state of the transmitter and the receiver between the times of reception of the first and second OFDM frames;
    measuring a discrepancy between the second channel estimate and the adjusted first channel estimate;
    modifying the second channel estimate by averaging the second channel estimate with the adjusted first channel estimate if the discrepancy is smaller than a predetermined amount; and
    demodulating data from the second OFDM frame using the modified second channel estimate.

2. A method according to claim 1, wherein the shift in the operating state comprises a change in a difference between an RF carrier angle of the receiver and an RF carrier angle of the transmitter.

3. A method according to claim 2, wherein said adjusting step comprises estimating said change by:
    a) for each of a plurality of OFDM sub-carriers:
        i) providing a first channel estimate of that sub-carrier for the first OFDM frame;
        ii) providing a second channel estimate of that sub-carrier for the second OFDM frame; and
        iii) calculating the ratio of the first and second channel estimates for that sub-carrier; and
    b) deducing an estimate of said change from an averaging-based calculation on the ratios deduced for said plurality of OFDM sub-carriers.

4. A method according to claim 1, wherein the shift in the operating state comprises a change in the difference between the sampling instants of the transmitter and receiver.

5. A method according to claim 4, wherein said adjusting step comprises estimating said change by:
    a) for each of a plurality of OFDM sub-carriers:
        i) providing a first channel estimate of that sub-carrier for the first OFDM frame;
        ii) providing a second channel estimate of that sub-carrier for the second OFDM frame; and
        iii) calculating the ratio of the first and second channel estimates for that sub-carrier; and
    b) deducing an estimate of said change from an averaging-based calculation on the ratios deduced for said plurality of OFDM sub-carriers.

6. A method according to claim 1, wherein the shift in the operating state comprises a change in an amplification gain imposed by at least one of the transmitter and the receiver.

7. A method according to claim 6, wherein said adjusting step comprises estimating said change by:
    a) for each of a plurality of OFDM sub-carriers:
        i) providing a first channel estimate of that sub-carrier for the first OFDM frame;
        ii) providing a second channel estimate of that sub-carrier for the second OFDM frame; and
        iii) calculating the ratio of the first and second channel estimates for that sub-carrier; and
    b) deducing an estimate of said change from an averaging-based calculation on the ratios deduced for said plurality of OFDM sub-carriers.

* * * * *